March 17, 1959 — J. B. GLOVER ET AL — 2,878,031
DEVICE FOR SNUBBING WHEEL SUSPENSION STRUCTURE TO VEHICLE FRAME
Filed April 20, 1955 — 2 Sheets-Sheet 1

INVENTORS,
JAMES B. GLOVER,
GLEN O. PETERS
BY Barnes, Kisselle, Laughlin & Raisch
ATTORNEYS.

March 17, 1959 J. B. GLOVER ET AL 2,878,031
DEVICE FOR SNUBBING WHEEL SUSPENSION STRUCTURE TO VEHICLE FRAME
Filed April 20, 1955 2 Sheets-Sheet 2
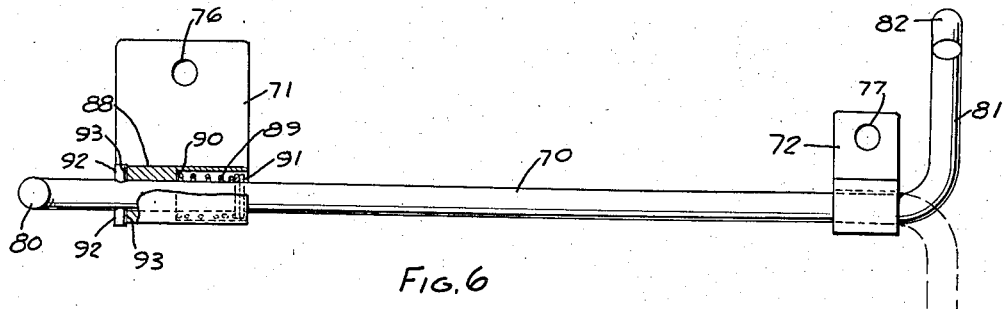
FIG. 6
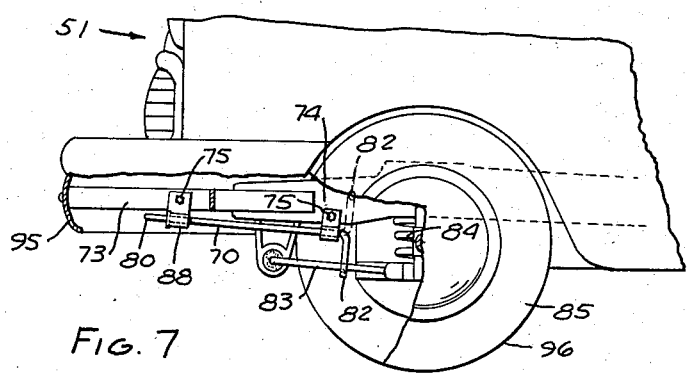
FIG. 7
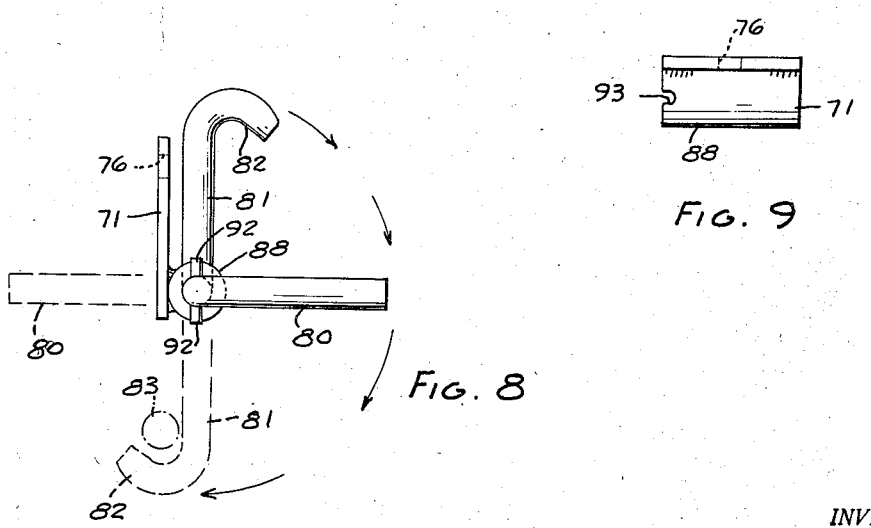
FIG. 9
FIG. 8
INVENTORS,
JAMES B. GLOVER,
GLEN O. PETERS
BY Barnes, Kisselle, Laughlin & Rausch
ATTORNEYS

United States Patent Office 2,878,031
Patented Mar. 17, 1959

2,878,031

DEVICE FOR SNUBBING WHEEL SUSPENSION STRUCTURE TO VEHICLE FRAME

James B. Glover and Glen O. Peters, Chatham, Ontario, Canada

Application April 20, 1955, Serial No. 502,590

1 Claim. (Cl. 280—150)

This invention relates generally to a device for locking the springs of a vehicle wheel suspension structure in compressed condition on the vehicle frame.

Modern automotive vehicles are usually equipped with bumper type jacks. To change a tire the bumper must be jacked up sufficiently to relieve the stress in the wheel suspension springs and then sufficiently further for the suspension structure to pull the wheel off of the ground. This necessitates an inconvenient amount of jacking and the vehicle frame and body are often elevated to such an extent that the vehicle is in danger of slipping off of the jack.

Attempts have been made heretofore to provide devices facilitating body jacking or bumper jacking of automobiles, but these devices generally have been either inconvenient of operation, complicated and expensive, or unsuited to use in modern automobile structures.

An object of this invention is to provide an improved suspension snubbing device which has simple, inexpensive construction and which is convenient and positive in its operation. The invention generally contemplates the use of a rod which is axially and rotatably shiftable on the vehicle frame and which has an element positively positionable for snubbing the suspension structure by a simple shifting and turning movement of a conveniently positioned operating handle on the rod. Two forms of the invention are shown in the accompanying drawings:

Fig. 6 is a generally plan view of a modified form of the invention with parts broken away and shown in section to illustrate structure.

Fig. 7 is a partly diagrammatic view illustrating the device of Fig. 6 in use on an automobile.

Fig. 8 is a partly diagrammatic end view illustrating operation of the snubber element in the modified form.

Fig. 9 is a partly diagrammatic top plan view of the forward bracket element of the modified form separate from the control rod.

Figure 1:
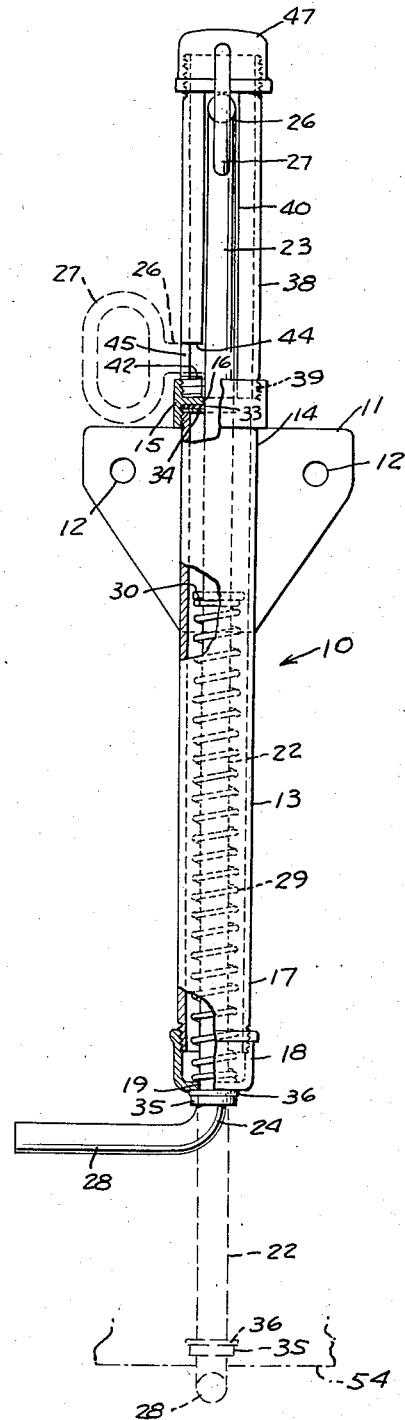
Fig. 1 is a generally plan view of a device according to this invention with parts broken away and shown in section to illustrate the structure.

The device 10 of this invention includes a bracket 11 apertured as at 12 to receive mounting bolts and having a guide preferably in the form of a tube 13 secured thereto as by welding. The upper end portion 14 of the tube is closed preferably by a threadedly attached cap 15 having a central opening 16 therein and the lower end portion 17 of the tube is closed preferably by a threadedly attached cap 18 having a central opening 19 therein. An operating rod 22 extends axially through tube 13 with its upper and lower end portions 23 and 24 respectively projecting slidably and rotatably through openings 16 and 19 in the tube caps.

The upper end of control rod 22 has a laterally extending bearing portion 26 terminating in an operating handle 27 and the lower end portion of the rod is formed laterally to provide a snubber element 28. The bearing element and snubber element are shown as extending at right angles to each other. A coil spring 29 disposed within tube 13 and around rod 22 is compressed against lower cap 18 and reacts against a pin 30 on the rod to bias the rod in the upward solid line position shown in Fig. 1.

A dust seal is secured around rod 22 adjacent opening 16 in the upper cap by such means as a washer 34 at the upper end of the tube as shown in Fig. 1. The lower portion 24 of rod 22 has an enlargement 35 forming a shoulder which supports a lower dust seal 36 engaging around rod 22 and seating against the exterior of cap 18 adjacent opening 19 when the rod is in the upper or solid line position of Fig. 1.

Guide tube 13 preferably has a tubular extension 38 forming a housing for the upper end portion 23 of control rod 22. Extension 38 is preferably coaxial with tube 13 and may be secured thereto by a threaded attachment to cap 15 as shown at 39.

Figures 4, 5:
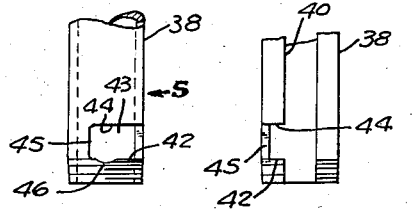
Fig. 4 is a fragmentary plan view illustrating detail at a load bearing part of the device.
Fig. 5 is a fragmentary plan view taken in the direction of arrow 5 in Fig. 4.

Extension 38 has a longitudinal slot 40 through which bearing element 26 and operating handle 27 project. Tube 13 has at its upper end a circumferentially extending bearing shoulder forming a bearing surface and this shoulder is preferably formed by the lower surface 42 of a generally horizontal circumferentially extending slot or recess 43 at the lower end of extension 38 (Figs. 4 and 5). Circumferential slot 43 opens into slot 40 and has an upper surface 44 forming a retaining shoulder, an end surface 45 and preferably a depression 46 in shoulder portion 42. The upper end of housing 38 is preferably closed by a threadedly attached cap 47.

In use, bracket 11 is mounted on the frame 50 of an automobile 51 as by bolts 52 in a position generally above axle 53 and wheel suspension springs 54 which are secured to frame 50 through front and rear shackles 55 and 56. Tube 13 and control rod 22 are disposed in a generally vertical position as shown. During normal operation of the vehicle, operating handle 27 and bearing element 26 are rotatively positioned to coincide with slot 40 so that spring 29 supports control rod 22, the bearing element, operating handle and snubber element 28 in the upper retracted position shown in solid lines in Fig. 1 and shown in broken lines in Fig. 2.

To elevate vehicle wheel 58 off of the ground by means of a jack (not shown) engaged beneath bumper 59, for example to change a tire 60, operating handle 27 is depressed in slot 40 against the action of spring 29 and is rotated so that bearing element 26 enters circumferential slot 43 in extension 38 and engages against end surface 45. During this movement of the operating handle, snubber element 28 moves vertically downwardly past spring 54 and rotates to a position beneath spring 54. The parts are thus positively positioned as shown generally in solid lines in Fig. 2 and in broken lines in Fig. 1. In this position there may be a relatively small clearance between snubber element 28 and spring 54 so that when operating element 27 is released, spring 29 will shift the operating rod upwardly somewhat. Bearing element 26 engages against upper shoulder 44 in slot 43, as shown in broken lines in Fig. 1, to hold the rod in its lowered position.

When bumper 59 is jacked up, automobile frame 50 is elevated and carries snubbing device 10 upwardly. Snubber element 28 engages beneath spring 54 (Figs. 2 and 3) and the load on the snubber element is transmitted through rod 22 to bearing element 26 which bears upon shoulder 42 at the upper end of tube 13. The bearing element is received by depression 46 in shoulder 42 so that the control rod is locked against rotation by the load thereon. Spring 54 is now securely snubbed to frame 50 so that upon continued elevation of the frame, spring 54 is carried upwardly in its stressed condition and axle 53 and wheel 58 thereon are immediately elevated. In order to raise wheel 58 off of the ground, bumper 59 need be jacked up only slightly more than the amount necessary to take up the clearance between snubber 28 and spring 54 and to relieve the distortion in tire 60 caused by the weight of the car.

When tire 60 or its replacement is lowered to the ground by lowering bumper 59 and frame 50, the load on snubber element 28, rod 22 and bearing element 26 is relieved and operating handle 27 may be rotated to alignment with longitudinal slot 40 in housing 38 so that bearing element 26 disengages upper shoulder 44 in circumferential slot 43. In this movement snubber element 28 is rotated to one side of automobile spring 54 and spring 29 in tube 13 returns the control rod to the upper retracted position shown in solid lines in Fig. 1 and in broken lines in Fig. 2.

Seal washer 36 is urged against the exterior of lower cap 18 by spring 29 in the retracted position of rod 22 to provide a seal excluding dust and dirt from tube 13. Upper seal washer 33 provides a further dust and dirt seal. Enlargement 35 at the lower portion 24 of the control rod together with washer 36 preferably provides a stop limiting the upward movement of control rod 22.

Figure 2:
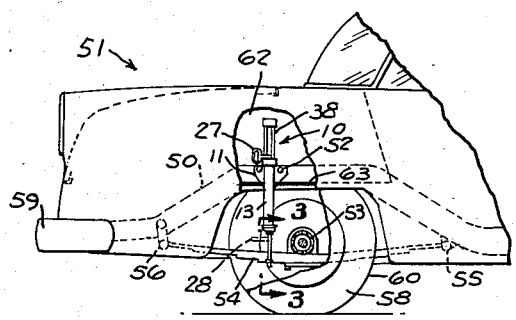
Fig. 2 is a partly diagrammatic view illustrating the device mounted on a vehicle.
Figure 3:
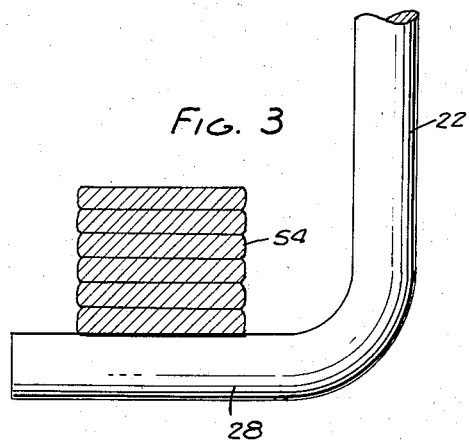
Fig. 3 is an enlarged fragmentary view on line 3—3 of Fig. 2, illustrating engagement of the snubber element with the vehicle springs.

The device is illustrated in Fig. 2 as being mounted at the rear of automobile 51 and in the arrangement shown the upper end portion of tube 13, housing 38 and operating handle 27 project above frame 50 and into the rear trunk 62 of the automobile. The floor of the trunk is represented at 63. Operating handle 27 is positioned for convenient manual manipulation. Dust seals 33 and 36 prevent dust and dirt from entering trunk 62 through tube 13. The device may also be mounted on forward portions of frame 50 and beneath the hood of the automobile for snubbing the front wheel suspension to the frame.

The modified form of the invention shown in Fig. 6 is similar to the principal form, having a control rod 70 rotatable and axially shiftable on a forward bracket element 71 and a rear bracket element 72 adapted to be secured to forward frame members 73 and 74 of vehicle 51 by such means as bolts 75 insertable through holes 76 and 77 in the bracket members. One end portion of rod 70 is formed laterally to provide an operating handle 80 and the other end portion of the rod is formed laterally to provide a snubber element 81. The operating handle and snubber element are shown as extending at right angles to each other. The end portion of snubber element 81 is return bent (Fig. 8) to provide a hook portion 82 for engaging the torsion bar 83 associated with the suspension spring 84 for a front wheel 85 of the vehicle.

One of the brackets, such as forward bracket 71, has a tubular guide portion 88 through which rod 70 projects and a stressed spring 89 is disposed within the guide element and around rod 70. Spring 89 seats on a portion 90 of guide 88 and reacts against a pin 91 on rod 70 to bias the rod toward the right relatively to bracket 71 as Figs. 6 and 7 are viewed. Rod 70 has laterally extending pins 92 which are urged by spring 89 toward engagement within slots 93 in one end of guide 88 to lock rod 70 against rotation on bracket 71. Rod 70 is shiftable axially to the left as Figs. 6 and 7 are viewed to disengage pins 92 from slots 93 to facilitate turning the rod. Pins 92 and slots 93 extend preferably oppositely to each other to facilitate locking snubber element 81 in an upper retracted position and a lower operative position 180 degrees apart.

The device is mounted on a vehicle 51 by securing bracket 71 to a forward frame element such as extension 73 supporting front bumper 95 so that operating handle 80 is positioned for convenient direct manual manipulation. Bracket element 72 is freely slidable on rod 70 and is secured to a selected suitable position on a forward portion 74 of the frame adjacent the wheel suspension. In normal operation of the vehicle snubber element 81 is locked by engagement of pins 92 in slots 93 to its upper retracted position as shown in solid lines in Figs. 6 and 8 and as shown in dotted lines in Fig. 7.

To change a tire 96 on wheel 85 rod 70 is shifted to the left to disengage pins 92 from slots 93 and is then rotated a half turn clockwise as Fig. 8 is viewed to lower snubber element 81 and engage hook portion 82 thereon beneath torsion bar 83. When snubber element 81 reaches its position beneath the torsion bar, pins 92 again snap into engagement within slots 93 under the action of spring 89 to lock rod 70 and the snubber element in position. Wheel 85 is then elevated by jacking bumper 95 upwardly, the front wheel suspension being snubbed to frame member 74 so that the amount of jacking required is relatively small. After the wheel has again been lowered to the ground, snubbing element 81 is disengaged from torsion bar 83 by shifting rod 70 axially to disengage pins 92 from slots 93 and turning the operating handle counter-clockwise as Fig. 8 is viewed until pins 92 snap into slots 93 to lock snubber element 81 in its upper retracted position.

Thus it is seen that the invention provides a simple, inexpensive device for limiting the movement between the frame and one or both axles of an automotive vehicle. The device may be positioned for convenient direct manual operation and provides for positive locating of the snubber element in operative position relative to the wheel suspension by manipulating the operating handle. The spacing between the snubber element in operative position and the vehicle part contacted thereby is predetermined in accordance with the structure of the particular vehicle so that the snubber element is properly located for engaging the wheel suspension regardless of whether the vehicle is empty or loaded. The spacing is also predetermined so that the vehicle frame and body parts such as fenders will be elevated to provide sufficient clearance for tire removal before the snubber element engages the wheel suspension.

The device reduces the amount of bumper jacking from approximately 31" or 32" to as little as 2½" to 3" for elevating a vehicle wheel off the ground.

We claim:

A device for locking the springs in a vehicle wheel suspension structure in stressed condition on the vehicle frame, said device comprising, a body which includes bracket means adapted to be permanently fixed on a vehicle frame generally above the wheel suspension structure, said body including guide means on said bracket means, rod means on said guide means, said rod means extending in a generally vertical direction when said bracket means is secured on a vehicle frame, said rod means being rotatable on said guide means on a generally vertical axis and being shiftable on said guide means along said axis to an upward position and a downward position, said rod means having a generally horizontally extending portion forming a snubber element, said rod means having another generally horizontally extending portion forming an operating handle, said horizontally extending portions being connected to said rod means so that said snubber element and operating handle are rotatable and shiftable with said rod means relatively to said bracket means, spring means supported by said body and biasing said rod means toward said upward position, said body having means forming a generally horizontal slot, said slot being defined in part by a lower generally horizontal bearing shoulder and an upper generally horizontal retaining shoulder, said body, bracket means, guide means, rod means, snubber element and operating handle being arranged so that when said rod means is in said downward position, said snubber element is selectively rotatable to and from a position subjacent the wheel suspension structure by turning said operating handle, said operating handle being positioned within said slot to engage upon said bearing shoulder when said snubber element is in said subjacent position, whereby when the vehicle frame is jacked up said operating handle bears upon said bearing shoulder at the lower part of said slot to tie the suspension structure to the frame and retain the wheel suspension structure in stressed condition relatively to the vehicle frame, said retaining shoulder being positioned for engagement by said operating handle when said snubber element is subjacent the suspension structure, whereby to maintain said rod means in said downward position against the action of said spring when load on said snubber element is relieved.

References Cited in the file of this patent

UNITED STATES PATENTS

| | | |
|---|---|---|
| 476,328 | Swope | June 7, 1892 |
| 2,050,543 | Peeples | Aug. 11, 1936 |
| 2,413,290 | Carter | Dec. 31, 1946 |
| 2,473,338 | Kilmer | June 14, 1949 |
| 2,568,231 | Grossman | Sept. 18, 1951 |
| 2,603,511 | Schatzman | July 15, 1952 |
| 2,735,692 | Vogt | Feb. 21, 1956 |